(12) United States Patent
Shepherd

(10) Patent No.: US 9,933,110 B2
(45) Date of Patent: Apr. 3, 2018

(54) TOOLLESS ALIGNMENT AND SECURING OF SENSOR OR OTHER DEVICE

(71) Applicant: SICK, INC., Minneapolis, MN (US)

(72) Inventor: Christian Shepherd, Minneapolis, MN (US)

(73) Assignee: SICK, INC., Minneapolis, MN (US)

( * ) Notice: Subject to any disclaimer, the term of this patent is extended or adjusted under 35 U.S.C. 154(b) by 0 days.

(21) Appl. No.: 15/203,487

(22) Filed: Jul. 6, 2016

(65) Prior Publication Data

US 2018/0010733 A1 Jan. 11, 2018

(51) Int. Cl.
| | |
|---|---|
| *F16M 13/00* | (2006.01) |
| *F16M 13/02* | (2006.01) |
| *F16C 11/10* | (2006.01) |
| *F16B 2/18* | (2006.01) |

(52) U.S. Cl.
CPC ............ *F16M 13/02* (2013.01); *F16B 2/185* (2013.01); *F16C 11/103* (2013.01); *F16C 11/106* (2013.01); *F16M 2200/022* (2013.01)

(58) Field of Classification Search
CPC .... F16M 13/02; F16M 11/041; F16M 13/022; F16M 11/10; F16M 13/00; F16M 11/14; F16M 11/105; F16M 2200/024; F16M 11/24; F16M 2200/028; F16M 11/08; F16M 11/04; F16M 11/2021; F16M 11/16
USPC ................ 248/222.14, 222.52, 276.1, 284.1
See application file for complete search history.

(56) References Cited

U.S. PATENT DOCUMENTS

| 4,945,785 | A | * | 8/1990 | Romano | B62K 23/06 |
| | | | | | 74/489 |
| 5,176,042 | A | * | 1/1993 | Bean | B62L 3/02 |
| | | | | | 188/24.11 |
| 5,311,792 | A | * | 5/1994 | Brown | B62K 23/06 |
| | | | | | 74/489 |
| 7,600,447 | B2 | * | 10/2009 | Burner | A01B 33/028 |
| | | | | | 74/502.2 |
| 9,499,230 | B1 | * | 11/2016 | Russ | B62K 11/14 |

FOREIGN PATENT DOCUMENTS

DE      19800553 C2      8/1998

* cited by examiner

*Primary Examiner* — Steven M Marsh
(74) *Attorney, Agent, or Firm* — Nath, Goldberg & Meyer; Jerald L. Meyer; Stanley N. Protigal

(57) ABSTRACT

Mounting apparatus is used for supporting an accessory device, e.g., a sensor, in a manner permitting adjustment. An accessory device-receiving mount is fixable to the accessory device and has at least one surface forming a cross-section permitting adjustment in at least one degree of freedom. A clamp ring engages the device-receiving mount at the surface, so that the cross-section permitting adjustment. A clamping mechanism selectively clamps the clamp ring and includes a manually threaded fastener and a lever-operated clamp tightener. The lever-operated clamp tightener acts on the manually threaded fastener to releasably tighten the clamping mechanism beyond that achieved by manually threading the manually threaded fastener, permitting manually threading the clamping arrangement at a maximum tension less than a full tension applied by the lever-operated clamp tightener.

13 Claims, 3 Drawing Sheets

TOOLLESS ALIGNMENT AND SECURING OF SENSOR OR OTHER DEVICE

BACKGROUND

Field

The present disclosure relates to toolless and minimum tool mounting of accessories in industrial environments such as conveyers and assembly lines. The present disclosure also relates to the mounting of cameras and similar equipment in industrial environments, in which positional alignment of the camera or other equipment is desired.

Background

In industrial environments, accessory devices such as sensors are often mounted for alignment with a conveyer or other equipment providing positioning or movement of items. The sensors can be, by way of non-limiting example, cameras and similar equipment. The purpose of the accessory device is to detect or otherwise engage with items or workpieces on the conveyer or equipment providing movement. In order to perform such tasks, the accessory device is positioned in its alignment in a manner which locks the accessory device in place.

In many cases, positioning or repositioning and alignment of the accessory device is frequently performed, such as with changes in the production run or type of accessory device being detected. Additionally, it is also possible that the configuration of the conveyer or other equipment is changed, which could affect the alignment of the accessory device with respect to the sensed items. Even if the type of accessory device is not changed, frequent adjustments in positioning or alignment are desired. While there are many instances in which the accessory device is adjusted at a time when a technician is performing other assembly or adjustment tasks, and would therefore have a toolbox available, there are other instances in which adjustment is not coincident with other operations, requiring that tools be retrieved specifically for the purpose of adjustment.

It is also desired that the positioning be stable, regardless of whether the type of accessory device is changed. Further, it is desired that the adjustments not require tools or require a minimum amount of tooling. In addition, it is desirable to be able to remove and replace or re-install the accessory device without a requirement that the alignment of the accessory device be performed.

SUMMARY

Mounting apparatus is provided for supporting an accessory device in a manner permitting adjustment. A device-receiving mount is fixable to the accessory device and comprising at least one surface forming a cross-section permitting adjustment in at least one degree of freedom. A clamp ring is used to engage the device receiving mount at the surface forming the cross section. The engagement of the device at the cross-section permits adjustment of the device-receiving mount with the accessory device. A clamping mechanism is configured to selectively clamp the clamp ring, using a manually threaded fastener and a lever-operated clamp tightener. The lever-operated clamp tightener acts on the manually threaded fastener to releasably tighten the clamping mechanism beyond that achieved by manually threading the manually threaded fastener. The operation of the manually threaded fastener and the lever-operated clamp tightener permits manually threading the clamping arrangement at a maximum tension less than a full tension applied by the lever-operated clamp tightener.

BRIEF DESCRIPTION OF THE DRAWINGS

FIG. 3A shows the sensor mount and sensor.
FIG. 3B shows a cover member lifted to loosen the sensor within the mount and to allow finger tightening or loosening of a clamping mechanism.
FIG. 3C shows a sensor attachment used to directly hold the sensor.
FIG. 3D shows the sensor attachment aligned for being received by the clamping mechanism.
FIG. 3E shows a tapered surface arrangement used to effect tightening of the clamping mechanism when the cover member is closed against a base member.

DETAILED DESCRIPTION

Figure 1:
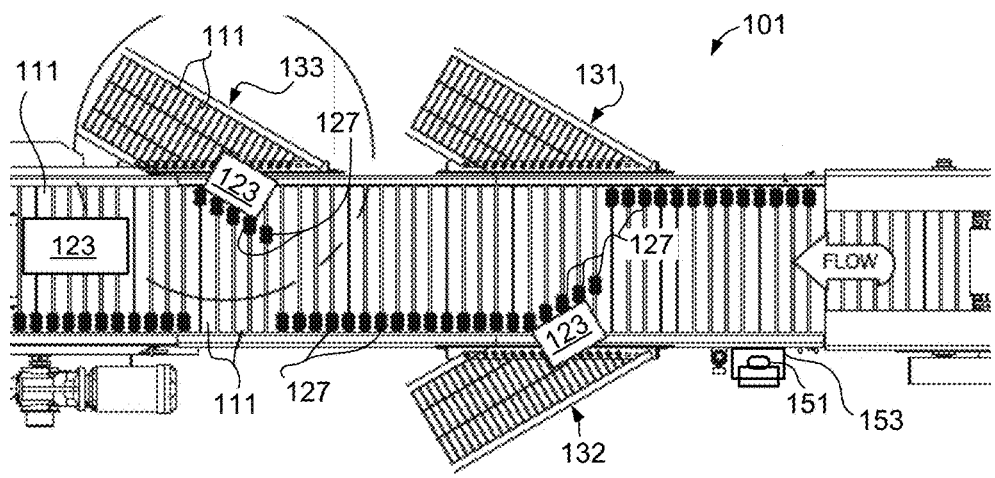
FIG. 1 is a diagram showing a roller conveyer system.
Figure 2:
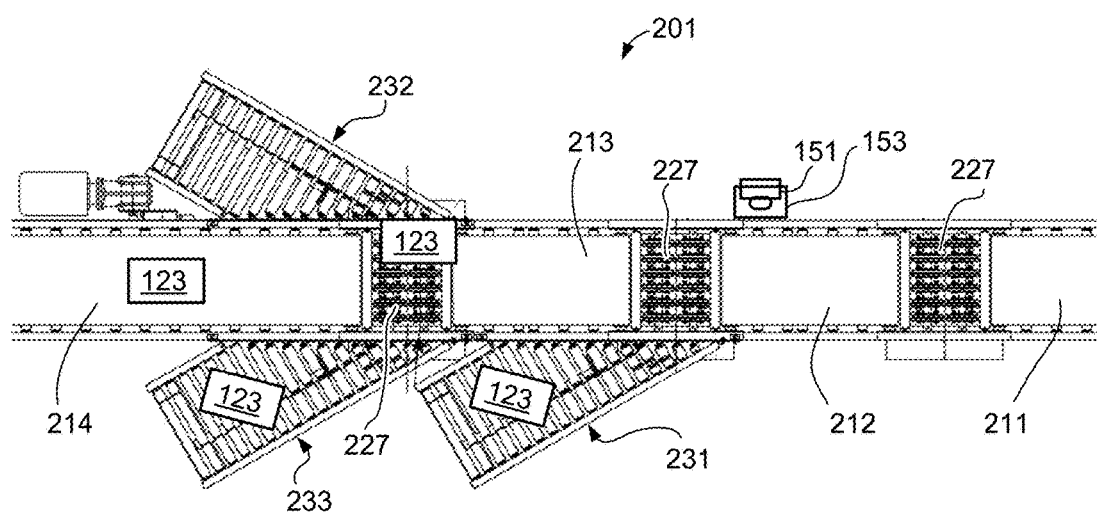
FIG. 2 is a diagram showing a belt conveyer system.

FIGS. 1 and 2 are diagrams respectively showing roller and belt conveyer systems, which are configured on-site to allow a particular operation. In the non-limiting example shown, the particular operation is diverting items on the conveyers, it being understood that the particular operation of the conveyer and the diversion are not part of the disclosed technique. In FIG. 1, conveyer system 101 has rollers 111 which cause items 123 to move along the conveyer system 101. Diverter dogs 127 are used to cause items to move onto selected ones of side conveyers 131, 132, 133. One or more camera sensors 151 are fixed to camera mounts 153.

In FIG. 2, conveyer system 201 has conveyer belts 211-214 which cause items 123 to move along the conveyer. Diverter rollers 227 are used to cause items to move onto selected ones of side conveyers 231, 232, 233. If it is desired to sequence the movement of the items 123 to the side conveyers 131-133 or 231-233, the presence of the item approaching the side conveyers 131-133 or 231-233 must be taken into account, typically by sensing or detecting the presence of the items 123. If changes are made to the system, this could affect the sensing or detecting.

One way to detect the presence of items 123 is to use a camera sensor 151, mounted on a camera mount 153. While timing can be used to estimate further movement, additional camera sensors (not shown) can be used at each individual side conveyor location. (Co-aligned locations, e.g., side conveyers 131, 132, can use a single camera sensor.) These camera sensors 151 can be adjusted and can be removed and replaced as required.

FIGS. 3A-3E are schematic diagrams showing an example sensor assembly 301. While a specific configuration is shown, this is given as a non-limiting example in order to demonstrate the disclosed techniques.

Figure 3A:
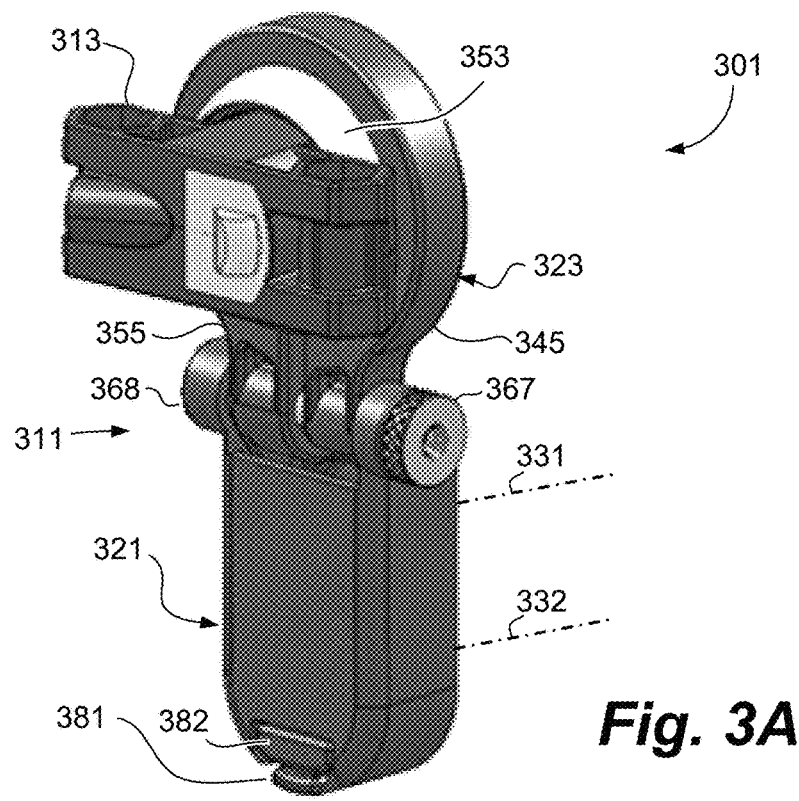
FIGS. 3A-3E are schematic diagrams showing a sensor assembly.
Figure 3B:
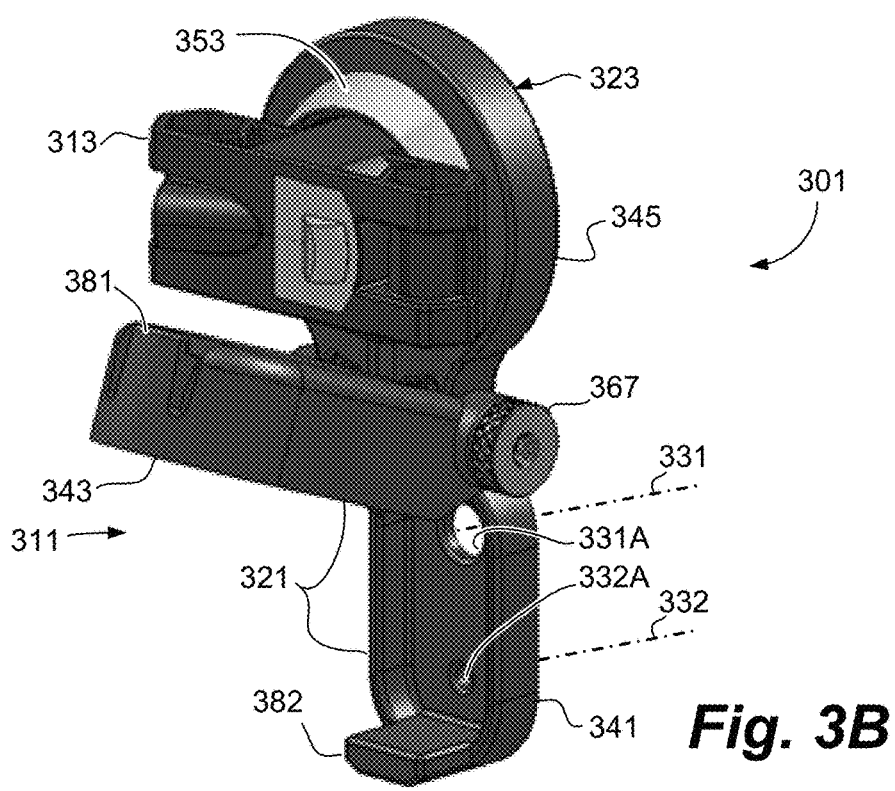

FIG. 3A shows sensor assembly 301, comprising sensor mount 311 and sensor 313. Sensor mount 311 comprises base 321 and sensor receiving portion 323. Base 321 is configured for vertical attachment to an accessory attachment point (not shown) at an appropriate location which is generally present on the conveyor system 101 or 201, in an alignment as depicted by horizontal lines 331, 332, using a fastener and alignment pin (FIGS. 3B and D). The attachment location of base 321 would correspond to the locations of camera mount 153 in FIGS. 1 and 2. Sensor 313 is received by sensor receiving portion 323 and can be removed and rotationally adjusted at sensor receiving portion 323.

The description of sensor assembly with sensor mount 311 and sensor 313 is given by way of non-limiting example, as any accessory device can be supported using the disclosed technology. Likewise, conveyer systems 101, 201 are given by way of non-limiting examples, as the technology can be used for any of a wide variety of applications requiring adjustable mounting of one device at a mounting location.

FIG. 3B is a schematic diagram showing sensor mount 311, and depicting base mounting portion 341 and cover member 343. FIG. 3B shows cover member 343 lifted. The lifting of cover member 343 results in sensor receiving portion loosening the sensor within sensor mount 311, as will be described. Sensor receiving portion 323 comprises clamp ring 345, which extends from base 321 and supports sensor attachment 353. Clamp ring 345 extends from base mounting portion 341 as part of sensor receiving portion 323. Bolt hole 331A and alignment pin 332A are used to position sensor mount 311 in alignment with the accessory attach points on the conveyer system 101 or 201.

Figure 3C:
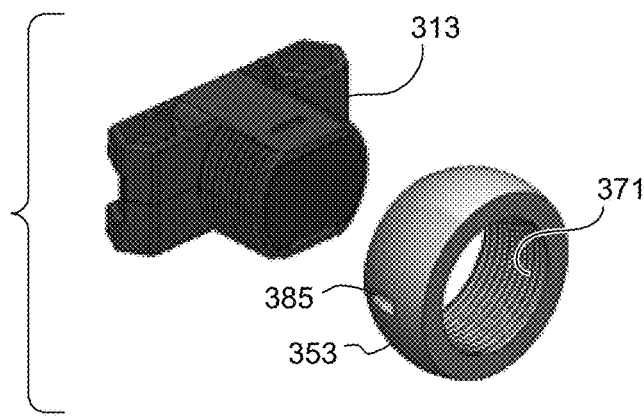
Figure 3D:
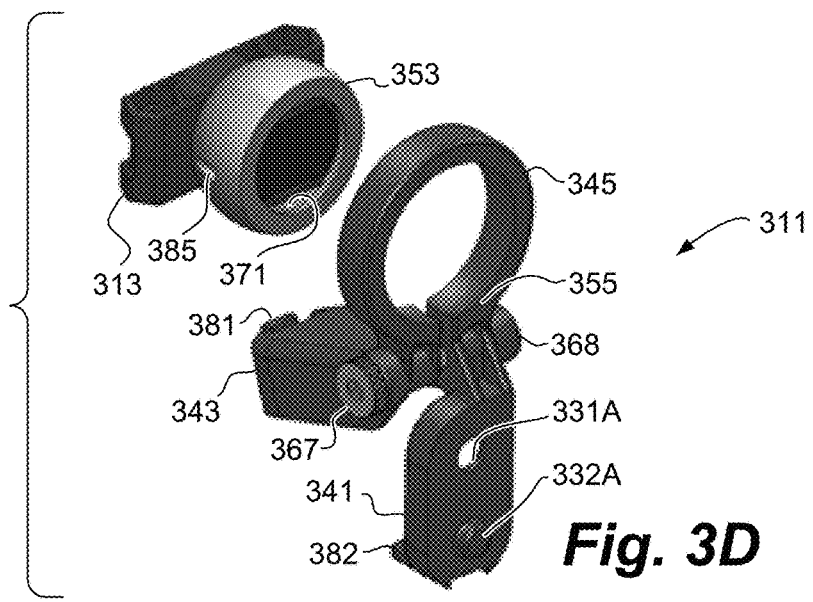

Sensor attachment 353 functions as a device carrier, to directly support sensor 313 or another accessory device in sensor mount 311. Sensor attachment 353 has an outer contour which allows movement. By way of non-limiting example, sensor attachment 353 has a spherical outer contour, as shown in FIGS. 3C and D. The spherical outer contour extends along a surface area where sensor attachment is engaged by clamp ring 345, as shown in FIGS. 3A and B. The example shown in FIGS. 3C and D show sensor attachment 353 as a sphere section; however, it is possible to construct sensor attachment 353 with parts of its outer contour not conforming to the spherical shape and still provide the spherical outer contour where sensor attachment 353 is engaged by clamp ring. While the example shown in FIGS. 3A-D use a spherical contour to allow rotational movement in up to 3 degrees of freedom, other contours, such as cylindrical contours or linear contours can be used to achieve different types of movement.

Sensor attachment 353 in turn receives sensor 313 and allows rotation of sensor 313 by virtue of sensor attachment 353 being able to rotate within clamp ring 345 until clamp ring 345 is tightened. Knurled knob and bolt assembly 367, 368 are used to secure sensor attachment 353 within clamp ring 345. When base 321 is mounted to the accessory attachment point, freedom of adjustment is at sensor attachment 353. Sensor attachment 353 forms a cross-section permitting adjustment in 3 degrees of freedom when supported by clamp ring 345.

It is noted that sensor attachment 353 is formed as a sphere section and not as a complete ball or sphere, with threaded sensor receiving opening 371 transecting sensor attachment 353. This precludes full 360° movement of sensor 313; however, full 360° movement of sensor 313 is not a sensor adjustment criterion. While sensor attachment 353 allows 3 degrees of freedom of adjustment, it is alternatively possible to provide an attachment device which permits 1 or 2 degrees of freedom, and to provide an attachment device which also permits extension or lateral movement of the item being supported by the attachment device.

Knurled knob and bolt assembly 367, 368 allow tightening and loosening adjustment of clamp ring 345 by manual threading. As used herein, "manual threading" refers to manually rotating the threaded parts (i.e., screwing or rotating the parts on the threads; not fabricating the threads).

In this non-limiting example, clamp ring 345 and base mounting portion 341 are formed as a single unit, with the extension of clamp ring 345 from base mounting portion 341 at a fixed end 355 of clamp ring 345. Clamp ring 345 has sufficient elastic movement to permit insertion and removal of sensor attachment 353. In that arrangement, clamp ring 345 is fixed to base mounting portion 341, but is able to flex sufficiently to receive sensor attachment 353. This arrangement also makes it easier to assemble the sensor mount, as the movement between base mounting portion 341 and clamp ring 345 is limited to the flexibility of clamp ring 345.

Cover member 343 is attached to clamp ring 345 where clamp ring 345 joins base mounting portion, and extends around clamp ring 345 where knurled knob and bolt assembly 367, 368 pass through clamp ring 345. When knurled knob and bolt assembly 367, 368 are loose, cover member 343 can pivot freely, and if knurled knob and bolt assembly 367, 368 are removed, cover member 343 can be removed entirely. When knurled knob and bolt assembly 367, 368 are tightened, cover member 343 functions as outer washer elements and clamps clamp ring 345 tight under the tensile force of the tightened knurled knob and bolt assembly 367, 368.

The configuration of the base mounting portion 341 and clamp ring 345, in combination with cover member 343 and knurled knob and bolt assembly 367, 368 is such that knurled knob and bolt assembly 367, 368 form a hinge pivot for cover member 345 to rotate with respect to base mounting portion 341 and clamp ring 345. Thus, cover member 343 is able to be rotated about an axis of knurled knob and bolt assembly 367, 368, and the combination of base mounting portion 341 and clamp ring 345, cover member 343 and knurled knob and bolt assembly 367, 368 form part of a hinge arrangement.

Therefore, knurled knob and bolt assembly 367, 368, when tightened, secure sensor attachment 353 by tightening clamp ring 345. Knurled knob and bolt assembly 367, 368 can be loosened as necessary to allow sensor attachment 353 to be moved either easily, or against frictional resistance of clamp ring 345 when partially-tightened.

Figure 3E:
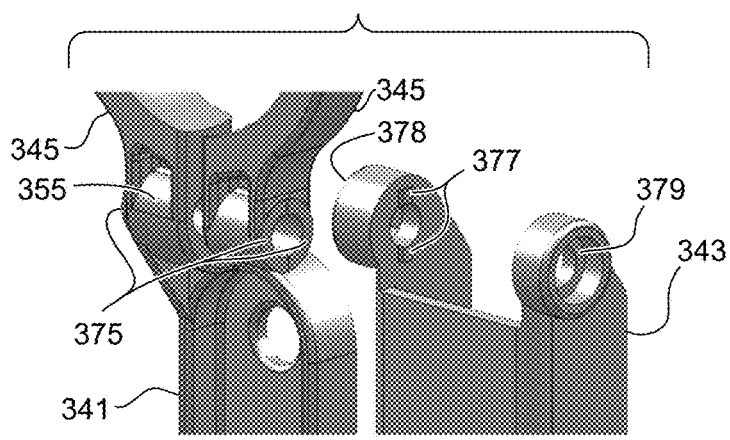

FIG. 3E shows a tapered surface arrangement comprising tapered or ramped surfaces 375 forming mating surfaces of clamp ring 345, and raised contacting followers 377 on cover member 343. Ramped surfaces 375 are recessed in a rotational direction, as circularly ramping surfaces, which increases clamping of clamp ring 345 when cover member 343 is closed against base mounting portion 341. (Contacting followers 377 are formed on both legs of clamp ring 345 and ramped surfaces 375 are formed on both legs of cover member 343.) Ramped surfaces 375 and contacting followers 377 cause the legs of cover member 343 to separate with respect to each other, thereby separating thrust bushing surfaces 378, 379 against which knurled knob and bolt assembly 367, 368 seat. As a result of the movement of contacting followers 377 against ramped surfaces 375, the lifting of cover member 343 results in sensor receiving portion loosening the sensor within sensor mount 311 to allow finger tightening or loosening of a clamping mechanism and allows directional adjustment of sensor attachment 353. When cover member 343 is closed against base mounting portion 341, the increased clamping pressure prevents or inhibits movement of sensor attachment 353.

Latch mechanism 381, 382 at the bottom of cover member 343 and base mounting portion 341 (FIGS. 3A and B) retain cover member 343 in the closed position unless deliberately released.

Thrust bushing surfaces 378, 379 provide seating surfaces for knurled knob and bolt assembly 367, 368 to tighten against, and can accept knurled knob and bolt assembly 367, 368 directly or with washers, as desired. While thrust bushing surfaces 378, 379 are described, it is understood that thrust bushing surfaces 378, 379 need not be separate components from cover member 343.

The action of ramped surfaces 375 and raised contacting followers 377 allows securing clamp ring 345 with knurled knob and bolt assembly 367, 368 as finger-tight, and then closing cover member 343 over base mounting portion 341 to achieve a separation force on thrust bushing surfaces 378, 379, thereby increasing the clamping effect of knurled knob and bolt assembly 367, 368. The difference in clamping pressure with cover member 343 in the open (FIG. 3B) and closed (FIG. 3A) positions may, by way of non-limiting example, be sufficient to allow forced movement of sensor 313 mounted in sensor attachment 353 when cover member 343 is open, but prevent movement of sensor 313 mounted in sensor attachment 353 when cover member 343 is closed. Thus ramped surfaces 375 and raised contacting followers 377, as operated by cover member 343, function as a lever-operated clamp tightener.

The arrangement of the cover member 343 and latch mechanism 381, 382 as a technique for increasing clamping also provides a visual cue or visual indication that clamp ring 345 is tightened, provided that knurled knob and bolt assembly 367, 368 are properly adjusted and not loosened. This allows final tightening of sensor 313 in its adjusted position in a visually observable manner. Additionally, the final tightening of sensor 313 is achieved in a manner which is unlikely to affect the adjusted alignment of sensor 313 in sensor mount 311 because the clamping motion of clamp ring 345 is at a different location from the movement of cover member 343.

While it is possible that removal of sensor 313 can be accomplished by threadably removing sensor 313 from sensor attachment 353 while sensor attachment 353 is secured by clamp ring 345, it is also possible to threadably assemble sensor attachment 353 onto sensor 313 while sensor attachment 353 is removed from clamp ring 345. As shown in FIGS. 3C and E, sensor attachment 353 has one or more grooves 385 on its surface that can be used for gripping sensor attachment 353 with a spanner wrench or ring pliers; however, by clamping sensor attachment 353 with clamp ring 345, a technician can tighten sensor 313 inside sensor attachment 353 or remove sensor attachment 353 from sensor 313. This tightening operation may cause sensor 313 to be rotationally out of alignment, but clamp ring 345 can then be loosened to allow for alignment of sensor 313.

If the threaded sensor receiving opening 371 and sensor 313 are fabricated so that the rotational alignment of sensor attachment 353 on sensor 313 is predicable, groove 385 (or grooves 385) can be received by a corresponding pin (not shown) in clamp ring 345 to maintain alignment in at least one degree of freedom.

Nevertheless, with sensor attachment 353 secured against movement by knurled knob and bolt assembly 367, 368, sensor 313 can be removed or installed by threadably removing or attaching sensor 313 from or to sensor attachment 353. Sensor 313 can be removed by unscrewing from within sensor attachment 353. If sensor attachment remains clamped, the alignment of sensor 313 will not change because sensor attachment 353 remains in its clamped position. Therefore, if a sensor 313 is removed and a different sensor having the same focal or sensing geometry is attached, the alignment of the new sensor would remain the same as the original sensor 313.

OPERATION AND INDUSTRIAL APPLICATION

The configuration provides a technique for mounting a sensor or other accessory device to machinery or other equipment, in which some or all of the final assembly can be achieved without tools. This further allows positional adjustment of the accessory device (e.g., sensor 313) without tools, and can also allow the adjustment to achieved in a friction mount in order to achieve stability while making the adjustment, followed by securing the accessory device in its adjusted position. As a result of the operation of cover member 343 and latch mechanism 381, 382, the securing of the accessory device, can be achieved with minimal disturbance in the positional adjustment of the accessory device. If the lifting of cover member 343 does not substantially loosen clamp ring 345, the accessory device remains in its positional adjustment as a starting point for further adjustment.

CONCLUSION

It will be understood that many additional changes in the details, materials, steps and arrangement of parts, which have been herein described and illustrated to explain the nature of the subject matter, may be made by those skilled in the art within the principle and scope of the invention as expressed in the appended claims.

In particular, it is noted that, while a sensor mounted to production line equipment is described, the technology described can be used for many other types of mounting arrangements, and can be used in multiple environments in which adjustment and positioning is desired. The technology is particularly useful in environments in which field adjustment is desired without a requirement that tools be retrieved for purposes of achieving the adjustment. While positioning and alignment of a sensor is described, the technology can be used for positioning or alignment of a wide variety of devices.

LIST OF REFERENCES conveyer system 101
rollers 111
items 123
diverter dogs 127
side conveyers 131, 132, 133
camera sensor 151
camera mount 153
conveyer system 201
conveyer belts 211-214
diverter rollers 227
side conveyers 231, 232, 233
sensor assembly 301
sensor mount 311
and sensor 313
base 321
sensor receiving portion 323
horizontal lines 331, 332
bolt hole and alignment pin 331A, 332A
base mounting portion 341
cover member 343
clamp ring 345
sensor attachment 353
fixed end of clamp ring 355 knurled knob and bolt assembly 367, 368
threaded sensor receiving opening 371
tapered or ramped surfaces 375
raised contacting followers 377
thrust bushing surfaces 378, 379
latch mechanism 381, 382
groove 385

What is claimed is:

1. Mounting apparatus for supporting an accessory device in a manner permitting adjustment, the mounting apparatus comprising:
   a device-receiving mount fixable to the accessory device and comprising at least one surface forming a cross-section permitting adjustment in at least one degree of freedom;
   a clamp ring engaging the device-receiving mount at the surface forming the cross-section permitting adjustment; and
   a clamping mechanism configured to selectively clamp the clamp ring and comprising a manually threaded fastener and a lever-operated clamp tightener, the lever-operated clamp tightener acting on the manually threaded fastener to releasably tighten the clamping mechanism beyond that achieved by manually threading the manually threaded fastener, permitting manually threading the clamping arrangement at a maximum tension less than a full tension applied by the lever-operated clamp tightener, the lever-operated clamp tightener comprising a hinge arrangement having a ramped interface, whereby a movement of components of the hinge arrangement results in a change in spacing between thrust bushing surfaces seating against the manually threaded fastener.

2. The mounting apparatus of claim 1, wherein the ramped interface comprises circularly ramping surfaces, whereby a movement of components of the hinge arrangement about an axis of the manually threaded fastener results in a change in spacing between thrust bushing surfaces seating against the manually threaded fastener.

3. The mounting apparatus of claim 1, further comprising:
   the ramped interface configured so that a movement of a latchable component of the hinge arrangement results in a change in spacing between thrust bushing surfaces seating against the manually threaded fastener; and
   the movement of the latchable component results in a positioning of the latchable component which provides a visual indication of a latched status of the latchable component.

4. The mounting apparatus of claim 1, further comprising:
   the device-receiving mount comprising an outer surface formed as a sphere section, with the clamp ring engaging the device-receiving mount at the sphere section, the sphere section providing said at least one surface forming a cross-section permitting adjustment, thereby providing three degrees of movement of the device-receiving mount when not further restrained by guides or projections.

5. The mounting apparatus of claim 1, further comprising:
   the clamping mechanism comprising a hinged cover, whereby a movement of the cover results in a change in spacing between thrust bushing surfaces seating against the manually threaded fastener; and
   the movement of the hinged cover provides a visual indication of a clamped status of the lever-operated clamp.

6. Mounting apparatus for supporting an accessory device with a clamp in a manner permitting adjustment in which, in an adjustment mode, the mounting apparatus permits movement of the accessory device, and in a clamped mode, the mounting apparatus prevents movement of the accessory device, characterized by:
   a device-receiving mount fixable to the accessory device and comprising at least one surface forming a cross-section permitting adjustment in at least one degree of freedom;
   the clamp comprising a clamp ring engaging the device-receiving, mount at the surface forming the cross-section permitting adjustment;
   a clamping mechanism configured to selectively clamp the clamp ring and comprising a manually threaded fastener and a lever mechanism acting on the manually threaded fastener to releasably tighten the clamp beyond that achieved by manually threading the manually threaded fastener, permitting manually threading the clamp at a maximum tension less than a full tension applied by the lever mechanism; and
   the device-receiving mount comprises an outer surface formed as a sphere section, with the clamp ring engaging the device-receiving mount at the sphere section, the sphere section providing said at least one surface forming a cross-section permitting adjustment, thereby providing three degrees of movement of the device-receiving mount when not further restrained by guides or projections.

7. The mounting apparatus of claim 6, wherein:
   the lever-operated clamp tightener comprises a hinge arrangement having a ramped interface, whereby a movement of a latchable component of the hinge arrangement results in a change in spacing between thrust bushing surfaces seating against the manually threaded fastener; and
   the movement of the latchable component results in a positioning of the latchable component which provides a visual indication of a latched status of the latchable component.

8. The mounting apparatus of claim 6, further characterized by:
   the clamping mechanism comprising a hinged cover, whereby a movement of the cover results in a change in spacing between thrust bushing surfaces seating against the manually threaded fastener; and
   the movement of hinged cover provides a visual indication of a clamped status of the lever-operated clamp.

9. Mounting apparatus for supporting an accessory device in a manner permitting angular or positional adjustment, the apparatus comprising:
   means receiving to the accessory device fixably mountable to the accessory device and comprising at least one surface forming a cross-section permitting angular or positional adjustment in at least one degree of freedom;
   clamp means receiving the means receiving the accessory device, the clamp means cooperating with the means receiving the accessory device to permit the angular or positional adjustment in the at least one degree of freedom
   manually adjustable clamp force adjustment means; and
   lever means for releasably tightening the clamp means beyond that achieved by manually threading the manually adjustable clamp force adjustment means, permitting application and de-application of a maximum clamping pressure beyond that achieved by the manually adjustable clamp force adjustment means; and
   the means receiving to the accessory device comprising device-receiving mount comprising an outer surface formed as a sphere section, with the clamp means engaging the device-receiving mount at the sphere section, the sphere section providing said at least one surface forming a cross-section permitting adjustment, thereby providing three degrees of movement of the device-receiving mount when not further restrained by guides or projections.

10. The mounting apparatus of claim 9, further comprising:
the clamp means comprising a hinge arrangement having a tapered or ramped surface interface means, forming mating surfaces, whereby a movement of components of the hinge arrangement results in a change in spacing between thrust bushing surfaces seating against the manually adjustable clamp force adjustment means.

11. The mounting apparatus of claim 9, further comprising:
the clamp means comprising hinge means having a ramped interface comprising circularly ramping surfaces, whereby a movement of components of the hinge means about an axis of the manually adjustable clamp force adjustment means results in a change in spacing between thrust bushing surfaces seating against the manually adjustable clamp force adjustment means.

12. The mounting apparatus of claim 9, further comprising:
the clamp means comprising a hinge arrangement having a ramped interface, whereby a movement of a latchable component of the hinge arrangement results in a change in spacing between thrust bushing surfaces seating against the manually adjustable clamp force adjustment means; and
the movement of the latchable component results in a positioning of the latchable component which provides a visual indication of a latched status of the latchable component.

13. The mounting apparatus of claim 9, further comprising:
the clamp means comprising a hinged cover, whereby a movement of the cover results in a change in spacing between thrust bushing surfaces seating against the manually adjustable clamp force adjustment means; and
the movement of hinged cover provides a visual indication of a clamped status of the clamp means.

* * * * *